(12) United States Patent
Fukuzono et al.

(10) Patent No.: US 12,489,660 B2
(45) Date of Patent: Dec. 2, 2025

(54) WIRELESS COMMUNICATION SYSTEM, WIRELESS COMMUNICATION METHOD, AND RECEIVER

(71) Applicant: NTT, Inc., Tokyo (JP)

(72) Inventors: Hayato Fukuzono, Musashino (JP); Keita Kuriyama, Musashino (JP); Daisei Uchida, Musashino (JP); Masafumi Yoshioka, Musashino (JP); Toshifumi Miyagi, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/681,087

(22) PCT Filed: Sep. 3, 2021

(86) PCT No.: PCT/JP2021/032437
§ 371 (c)(1),
(2) Date: Feb. 5, 2024

(87) PCT Pub. No.: WO2023/032153
PCT Pub. Date: Mar. 9, 2023

(65) Prior Publication Data
US 2024/0275649 A1 Aug. 15, 2024

(51) Int. Cl.
*H04L 25/49* (2006.01)
*H04L 25/03* (2006.01)
*H04L 27/26* (2006.01)

(52) U.S. Cl.
CPC .......... *H04L 25/4917* (2013.01); *H04L 25/03* (2013.01); *H04L 27/26* (2013.01)

(58) Field of Classification Search
CPC ..... H04L 25/4917; H04L 25/03; H04L 27/26; H04B 1/04
See application file for complete search history.

(56) References Cited

U.S. PATENT DOCUMENTS 9,252,822 B2 * 2/2016 Eliaz ................. H04L 25/03885
2015/0070089 A1 * 3/2015 Eliaz .................... H03F 1/3258
330/149

FOREIGN PATENT DOCUMENTS

JP 2017-059889 A 3/2017
JP 6577800 B2 9/2019

OTHER PUBLICATIONS

Machine translation of KR-20100125593-A (Year: 2010).*
(Continued)

*Primary Examiner* — Jean B Corrielus
(74) *Attorney, Agent, or Firm* — XSENSUS LLP

(57) ABSTRACT

A wireless communication system according to an embodiment is a wireless communication system, in which a transmission device transmits the training signal to a reception device such that a plurality of signal points having different amplitudes on a constellation is included, and the reception device includes: an estimation unit that estimates the signal points included in the training signal of a case where it is assumed that, an input-output characteristic in a non-linear region of an amplifier is also linear; an equalization unit that performs initial equalization on a received signal; a correction unit that corrects a signal subjected to initial equalization by the equalization unit on the basis of the signal points estimated by the estimation unit; a likelihood calculation unit that calculates, with respect to a constellation before the amplifier amplifies a signal, a likelihood of a signal corrected by the correction unit.

8 Claims, 10 Drawing Sheets

(56) References Cited

OTHER PUBLICATIONS

Ibnkahla et al., "High-Speed Satellite Mobile Communications: Technologies and Challenges", Proceedings of the IEEE, vol. 92, No. 2, Feb. 2004, pp. 312-339.

* cited by examiner

Fig. 3
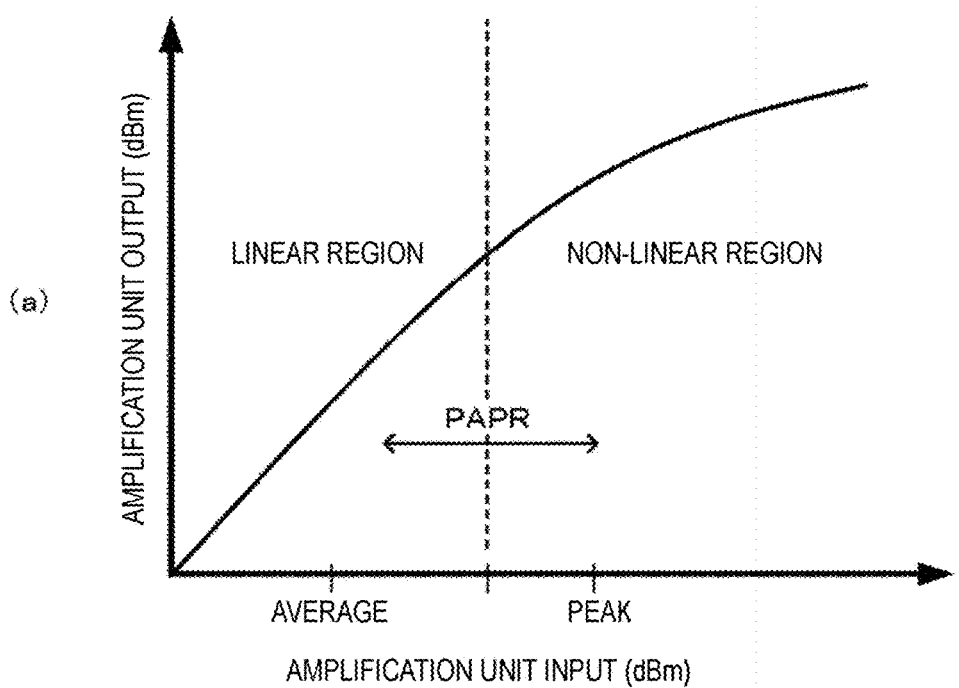
(a)
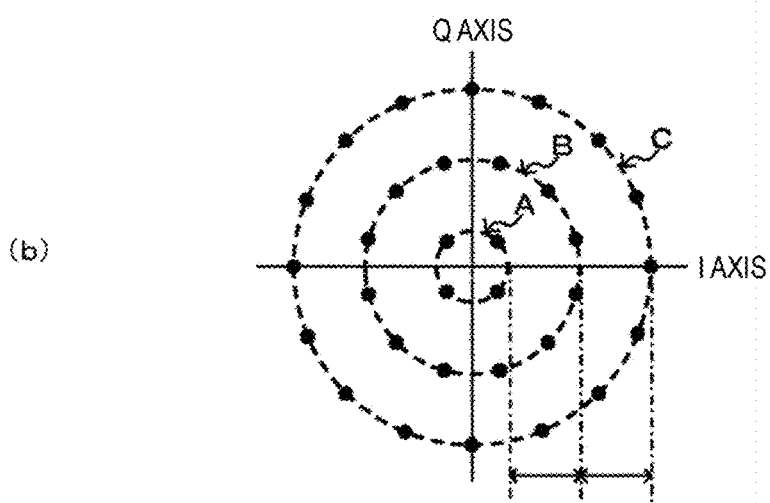
(b)
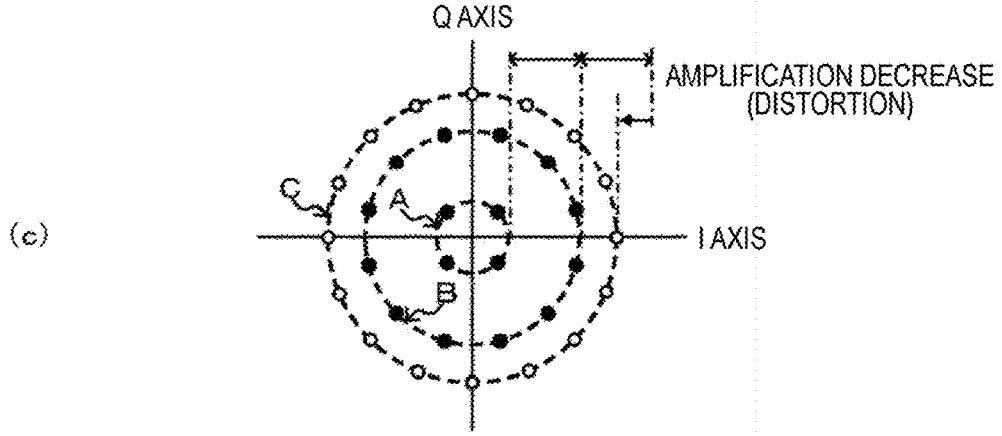
(c)

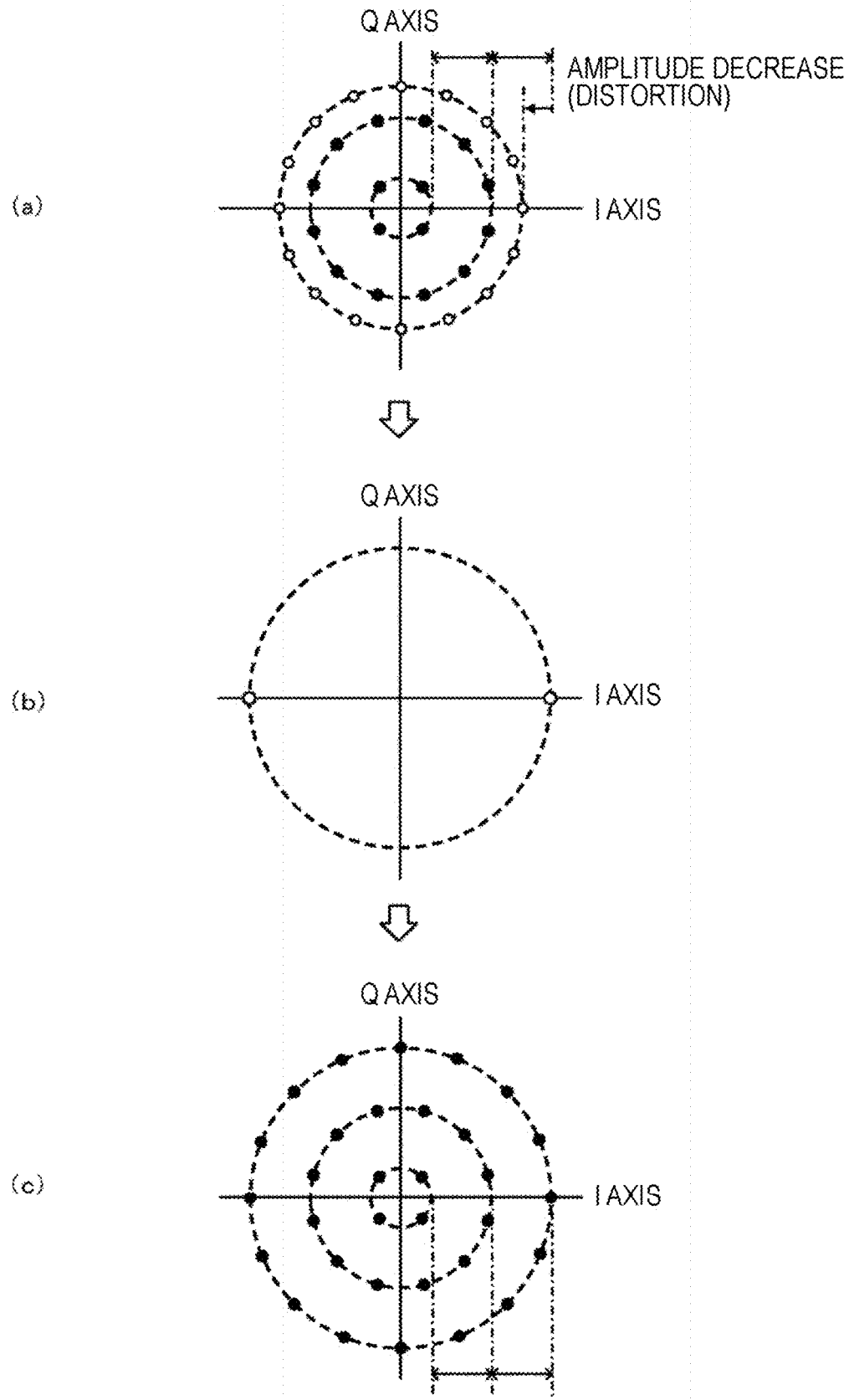

WIRELESS COMMUNICATION SYSTEM, WIRELESS COMMUNICATION METHOD, AND RECEIVER

CROSS-REFERENCE TO RELATED APPLICATION

The present application is a 371 of PCT application No. PCT/JP2021/032437, filed Sep. 3, 2021, the entire contents of which is incorporated herein by reference.

TECHNICAL FIELD

The present invention relates to a wireless communication system, a wireless communication method, and a reception device.

BACKGROUND ART

Conventionally, in a wireless communication system that performs single-carrier multi-level modulation, it is common to estimate a communication path by using a known signal such as binary phase-shift keying (BPSK) and perform demodulation by performing inverse calculation on a complex value of the estimation result.

In addition, in a case where a transmission device transmits a signal by using a non-linear region of an amplifier, it is known that a phase transition countermeasure is performed by using a plurality of pilot signals on concentric circles (see, for example, Patent Literature 1).

However, in a case where non-linearity exists in an amplification characteristic of the amplifier included in the transmission device, it has been necessary to correct a signal point having a large amplitude to a value having an amplitude smaller than a communication path estimated value of a case where the signal point is amplified with a linear amplification characteristic (see, for example, Non Patent Literature 1).

CITATION LIST

Patent Literature

Patent Literature 1: JP 2017-59889 A

Non Patent Literature

Non Patent Literature 1: MOHAMED IBNKAHLA, et al., "High-Speed Satellite Mobile Communications: Technologies and Challenges", PROCEEDINGS OF THE IEEE, VOL. 92, NO. 2, FEBRUARY 2004, p. 312-339

SUMMARY OF INVENTION

Technical Problem

The present invention has been made in view of the problem described above, and an object thereof is to provide a wireless communication system, a wireless communication method, and a reception device capable of accurately demodulating a signal even when a transmission device that performs single-carrier multi-level modulation transmits a signal amplified by using a non-linear region.

Solution to Problem

A wireless communication system according to an aspect of the present invention is a wireless communication system in which a reception device demodulates a signal on the basis of a training signal transmitted by a transmission device that performs single-carrier multi-level modulation, in which the transmission device transmits the training signal to the reception device such that a plurality of signal points having different amplitudes on a constellation is included, and the reception device includes: an estimation unit that estimates the signal points included in the training signal of a case where it is assumed that, on the basis of characteristic information indicating an input-output characteristic including a non-linear region of an amplification unit that is provided in the transmission device and amplifies a signal to be transmitted, an input-output characteristic in a non-linear region of the amplification unit is also linear; an equalization unit that performs initial equalization on a received signal; a correction unit that corrects a signal subjected to initial equalization by the equalization unit on the basis of the signal points estimated by the estimation unit; a likelihood calculation unit that calculates, with respect to a constellation before the amplification unit amplifies a signal, a likelihood of a signal corrected by the correction unit; and a demodulation unit that demodulates a signal on the basis of the likelihood calculated by the likelihood calculation unit.

In addition, a wireless communication method according to an aspect of the present invention is a wireless communication method in which a reception device demodulates a signal on the basis of a training signal transmitted by a transmission device that performs single-carrier multi-level modulation, the wireless communication method including: a transmission step in which the transmission device transmits the training signal to the reception device such that a plurality of signal points having different amplitudes on a constellation is included; an estimation step in which the reception device estimates the signal points included in the training signal of a case where it is assumed that, on the basis of characteristic information indicating an input-output characteristic including a non-linear region of an amplification unit that is provided in the transmission device and amplifies a signal to be transmitted, an input-output characteristic in a non-linear region of the amplification unit is also linear; an equalization step in which the reception device performs initial equalization on a received signal; a correction step in which the reception device corrects a signal subjected to initial equalization by the equalization step on the basis of the signal points estimated by the estimation step; a likelihood calculation step in which the reception device calculates, with respect to a constellation before the amplification unit amplifies a signal, a likelihood of a signal corrected by the correction step; and a demodulation step in which the reception device demodulates a signal on the basis of the likelihood calculated by the likelihood calculation step.

In addition, a reception device according to an aspect of the present invention is a reception device that demodulates a signal on the basis of a training signal transmitted by a transmission device that performs single-carrier multi-level modulation, the reception device including: an estimation unit that estimates a plurality of signal points included in the training signal transmitted by the transmission device such that the plurality of signal points having different amplitudes on a constellation is included on an assumption that, on the basis of characteristic information indicating an input-output characteristic including a non-linear region of an amplification unit that is provided in the transmission device and amplifies a signal to be transmitted, an input-output characteristic in a non-linear region of the amplification unit is also linear; an equalization unit that performs initial equalization on a received signal; a correction unit that corrects a signal subjected to initial equalization by the equalization unit on the basis of the signal points estimated by the estimation unit; a likelihood calculation unit that calculates, with respect to a constellation before the amplification unit amplifies a signal, a likelihood of a signal corrected by the correction unit; and a demodulation unit that demodulates a signal on the basis of the likelihood calculated by the likelihood calculation unit.

Advantageous Effects of Invention

According to the present invention, even when a transmission device that performs single-carrier multi-level modulation transmits a signal amplified by using a non-linear region, it is possible to accurately demodulate the signal.

BRIEF DESCRIPTION OF DRAWINGS

FIG. 3(a) is a graph illustrating an input-output characteristic of an amplification unit. FIG. 3(b) is a diagram illustrating a constellation of a transmission signal before being amplified by the amplification unit.

FIG. 3(c) is a diagram illustrating a constellation of a transmission signal after being amplified by the amplification unit by also using a non-linear region.

FIG. 10(a) is a diagram illustrating signal points subjected to initial equalization by an equalization unit.

FIG. 10(b) is a diagram illustrating a third communication path estimated value identified by an identification unit.

FIG. 10(c) is a diagram illustrating a constellation corrected by a correction unit.

DESCRIPTION OF EMBODIMENTS

Figure 1:
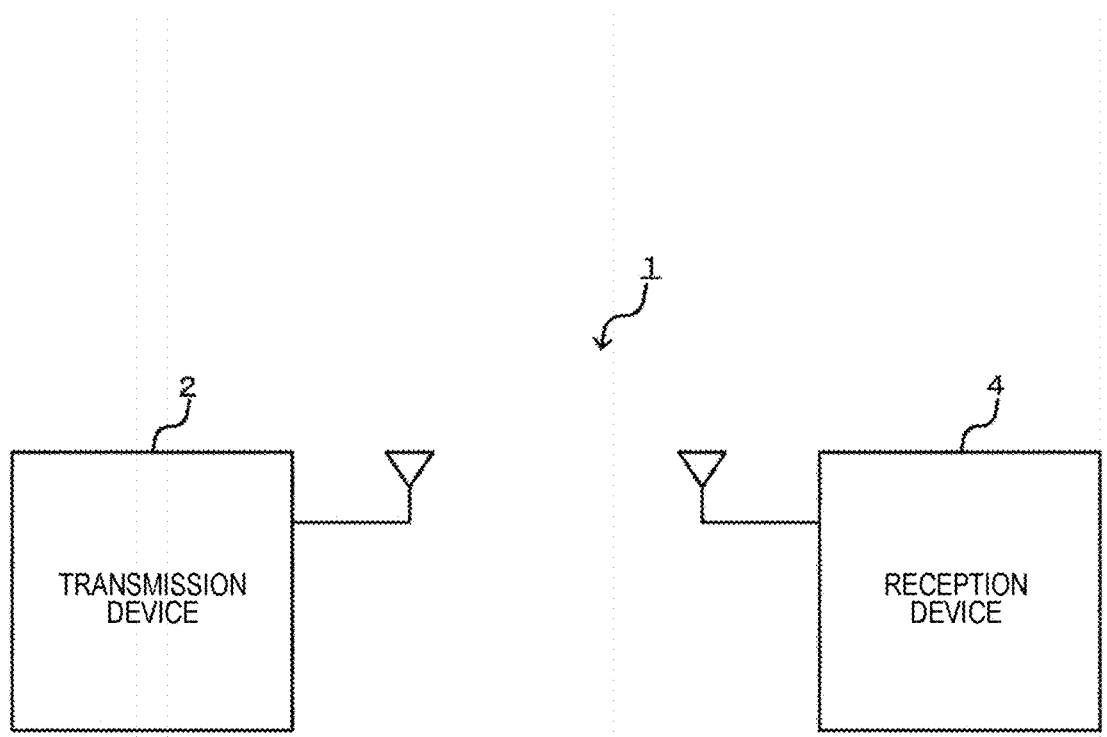
FIG. 1 is a diagram illustrating a configuration example of a wireless communication system according to an embodiment.

Hereinafter, an embodiment of a wireless communication system will be described with reference to the drawings. FIG. 1 is a diagram illustrating a configuration example of a wireless communication system 1 according to the embodiment. The wireless communication system 1 is configured such that, for example, a transmission device 2 that performs single-carrier multi-level modulation transmits a signal amplified by using a non-linear region, and a reception device 4 receives and demodulates the signal.

In addition, the transmission device 2 transmits a training signal for calculating communication path information (for example, channel state information (CSI)) to the reception device 4. The reception device 4 calculates the communication path information by using the received training signal, and transmits the calculated communication path information to the transmission device 2.

Note that, regarding the communication path information, there is a case where the transmission device 2 is known and a case where the transmission device 2 is unknown. In addition, the transmission device 2 and the reception device 4 may have the same function so that each perform transmission and reception.

Figure 2:
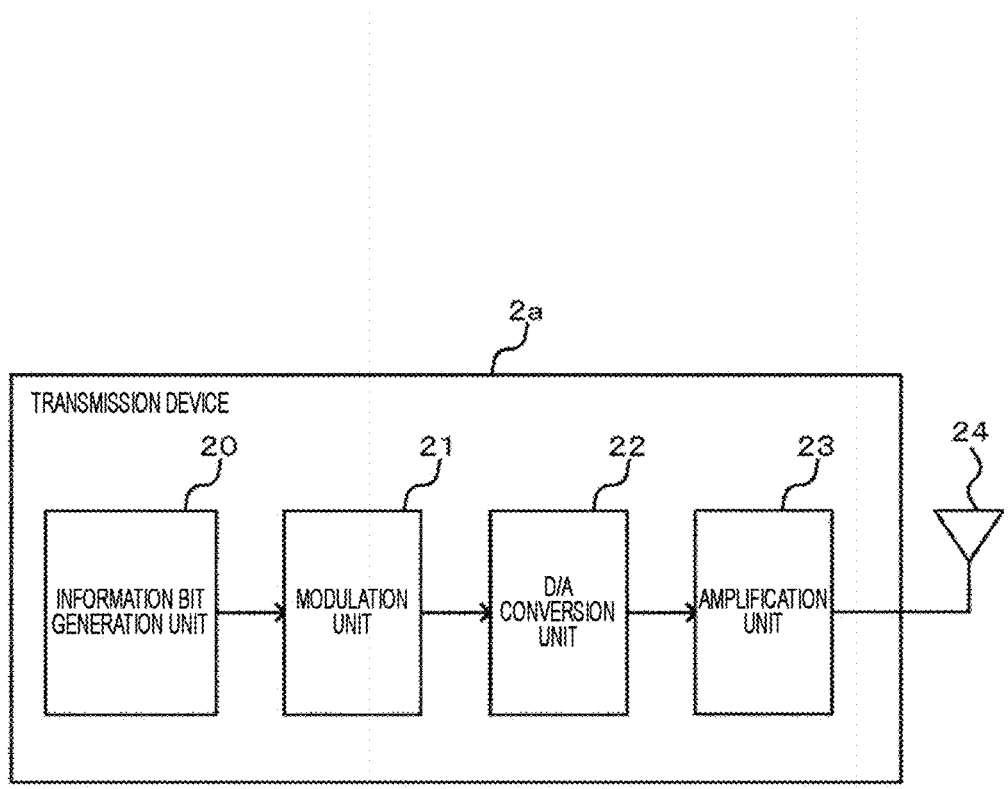
FIG. 2 is a functional block diagram illustrating functions of a transmission device of a comparative example.

Here, to help understanding of the configuration of the wireless communication system 1 according to the embodiment, first, a configuration example of a transmission device 2a of a comparative example will be described. FIG. 2 is a functional block diagram illustrating functions of the transmission device 2a of the comparative example.

As illustrated in FIG. 2, the transmission device 2a of the comparative example includes an information bit generation unit 20, a modulation unit 21, a D/A conversion unit 22, an amplification unit 23, and an antenna 24.

The information bit generation unit 20 generates information bits to be transmitted to the reception device 4, and outputs the information bits to the modulation unit 21. In addition, the information bit generation unit 20 may have an error correction coding function and an interleaving function.

The modulation unit 21 modulates the information bits generated by the information bit generation unit 20 into a data signal by, for example, a single-carrier multi-level modulation scheme, and outputs the data signal to the D/A conversion unit 22. Examples of the single-carrier multi-level modulation scheme performed by the modulation unit 21 include quadrature amplitude modulation (64 QAM, 256 QAM).

The D/A conversion unit 22 converts the data signal digitally modulated by the modulation unit 21 into an analog signal and outputs the analog signal to the amplification unit 23.

The amplification unit 23 amplifies the analog signal converted by the D/A conversion unit 22 and emits the amplified signal via the antenna 24.

FIG. 3 is a diagram illustrating an amplification characteristic of the amplification unit 23. FIG. 3(a) is a graph illustrating an input-output characteristic (amplification characteristic) of the amplification unit 23. FIG. 3(b) is a diagram illustrating a constellation of a transmission signal before being amplified by the amplification unit 23. FIG. 3(c) is a diagram illustrating a constellation of a transmission signal after being amplified by the amplification unit 23 by also using the non-linear region.

As illustrated in FIG. 3(a), the amplification unit 23 has a linear region in which amplification is performed in proportion to an input and output is performed, and a non-linear region in which amplification is performed non-linearly for an excessive input.

As illustrated in FIG. 3(b), no distortion occurs in the constellation of the transmission signal before being amplified by the amplification unit 23. In addition, also in a case where the amplification unit 23 amplifies the transmission signal by using only the linear region, similarly, no distortion occurs in the constellation of the transmission signal. Note that, in FIG. 3, a first inner circumference of the constellation is denoted by A, a second inner circumference is denoted by B, and an outermost circumference is denoted by C.

On the other hand, as illustrated in FIG. 3(c), in a case where the amplification unit 23 amplifies the transmission signal by also using the non-linear region, distortion (amplitude decrease) occurs in the constellation. Note that FIG. 3(c) illustrates a case where signal points of the first inner circumference and the second inner circumference are amplified in the linear region of the amplification unit 23, and signal points of the outermost circumference are amplified in the non-linear region of the amplification unit 23.

Figure 4:
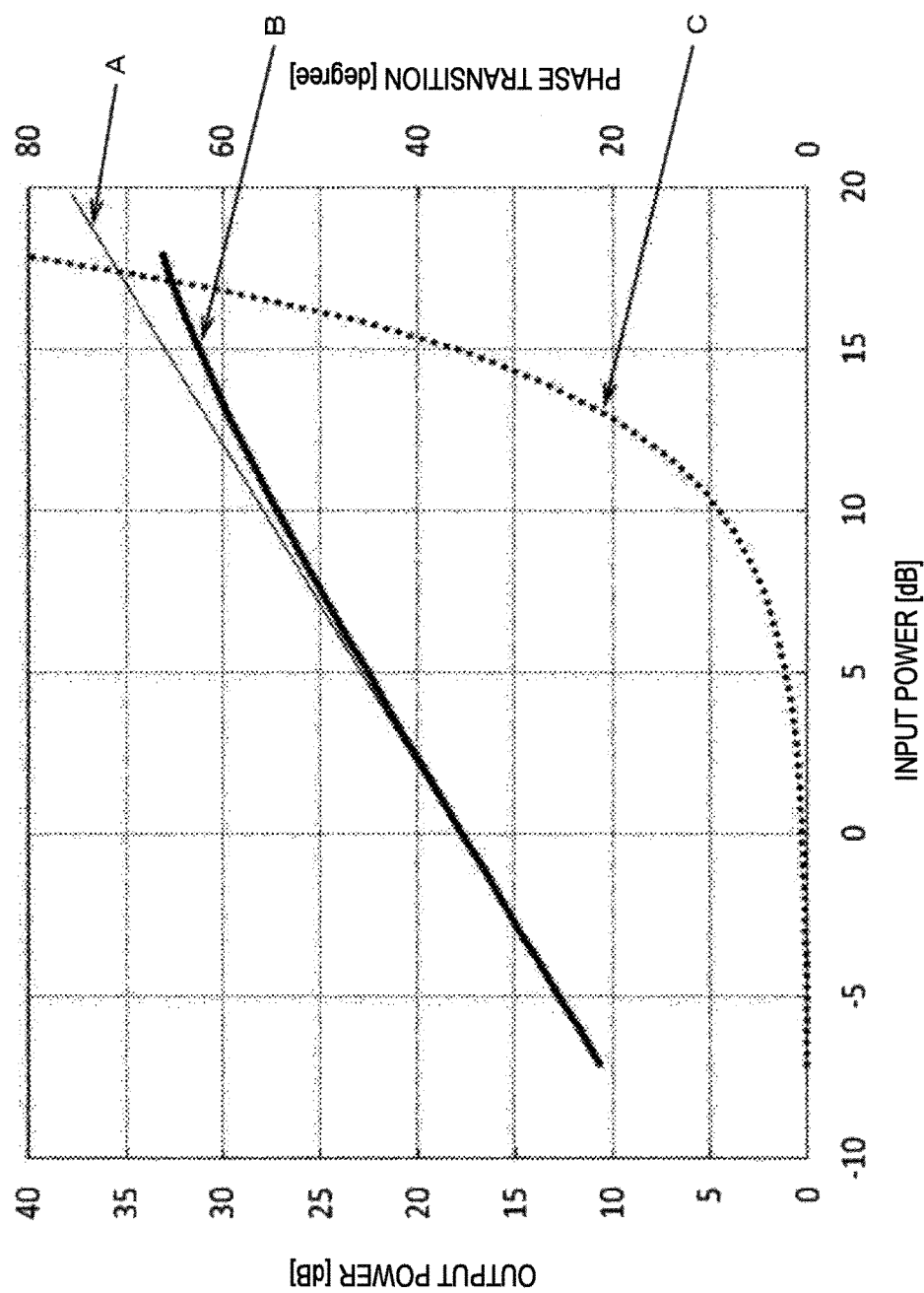
FIG. 4 is a graph more specifically illustrating the input-output characteristic of the amplification unit.

FIG. 4 is a graph more specifically illustrating the input-output characteristic of the amplification unit 23. In FIG. 4, A is an input-output characteristic of an ideal amplifier capable of linear amplification from a small input power to a large input power. B illustrates the input-output characteristic of the amplification unit 23. C is a graph illustrating phase transition of the amplification unit 23.

Figure 5:
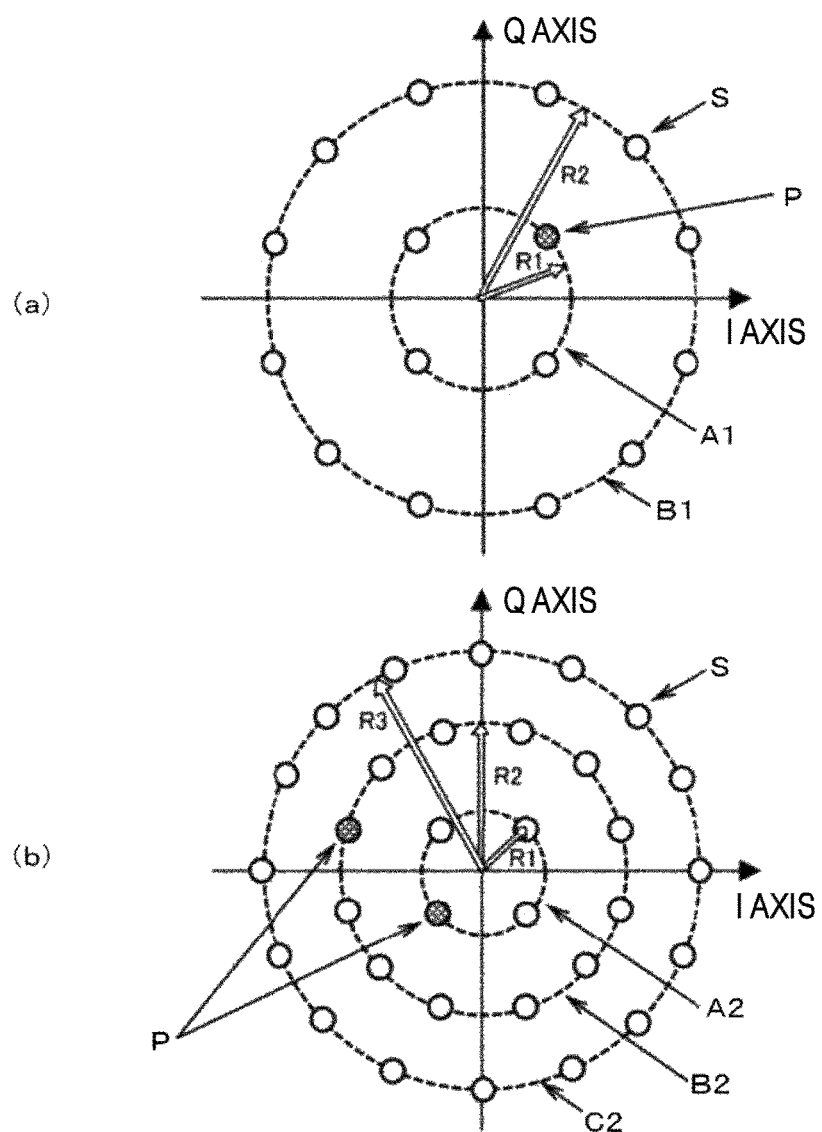
FIG. 5(a) is a diagram illustrating a phase transition countermeasure in 16 APSK.
FIG. 5(b) is a diagram illustrating a phase transition countermeasure in 32 APSK.

FIG. 5 is a diagram illustrating a phase transition countermeasure for the amplification unit 23 in a conventional technique. FIG. 5(a) is a diagram illustrating a phase transition countermeasure in 16 amplitude and phase shift keying (APSK). FIG. 5(b) is a diagram illustrating a phase transition countermeasure in 32 APSK.

As illustrated in FIG. 5(a), conventionally, in a constellation (inner circumference A1 and outermost circumference B1) including IQ coordinates of two ideal signal points having different radii (amplitudes), one or more ideal signal points P are transmitted as pilot signals (known signals) with respect to an amplitude level of the inner circumference A1, whereby phase transition is compensated.

In addition, as illustrated in FIG. 5(b), conventionally, in a constellation (first inner circumference A2, second inner circumference B2, outermost circumference C2) including IQ coordinates of three ideal signal points having different radii (amplitudes), one or more ideal signal points P are transmitted as pilot signals with respect to each of amplitude levels of the first inner circumference A2 and the second inner circumference B2, whereby phase transition is compensated.

As described above, conventionally, to compensate for phase characteristics different for respective amplitudes of the constellation, one pilot signal is arranged for each of signal points having different radii, whereby the reception device is enabled to compensate for the phase transition of the signal points and perform demodulation.

In the single-carrier multi-level modulation scheme, it is expected to improve an SNR by increasing average transmission power to an allowable value. On the other hand, when excessive transmission power is input to the amplification unit 23, an amplitude of a peak signal or the like decreases due to saturation. Then, when equalization is performed with a communication path response estimated by a training signal (for example, BPSK) in the linear region, a detection error occurs in the peak signal or the like. For that reason, in general, communication is performed with sufficiently low transmission power (small amplitude) at which no distortion occurs in the peak signal.

As described above, conventionally, even if an amplitude of a signal point transitions due to the input-output characteristic of the amplifier, the signal point cannot be compensated, and demodulation cannot be performed accurately in some cases.

Thus, the wireless communication system 1 according to the embodiment is configured such that, the transmission device 2 transmits a training signal to the reception device 4 such that a plurality of signal points having different amplitudes on a constellation is included, and the reception device 4 performs demodulation on the basis of the training signal, whereby demodulation can be accurately performed.

Figure 6:
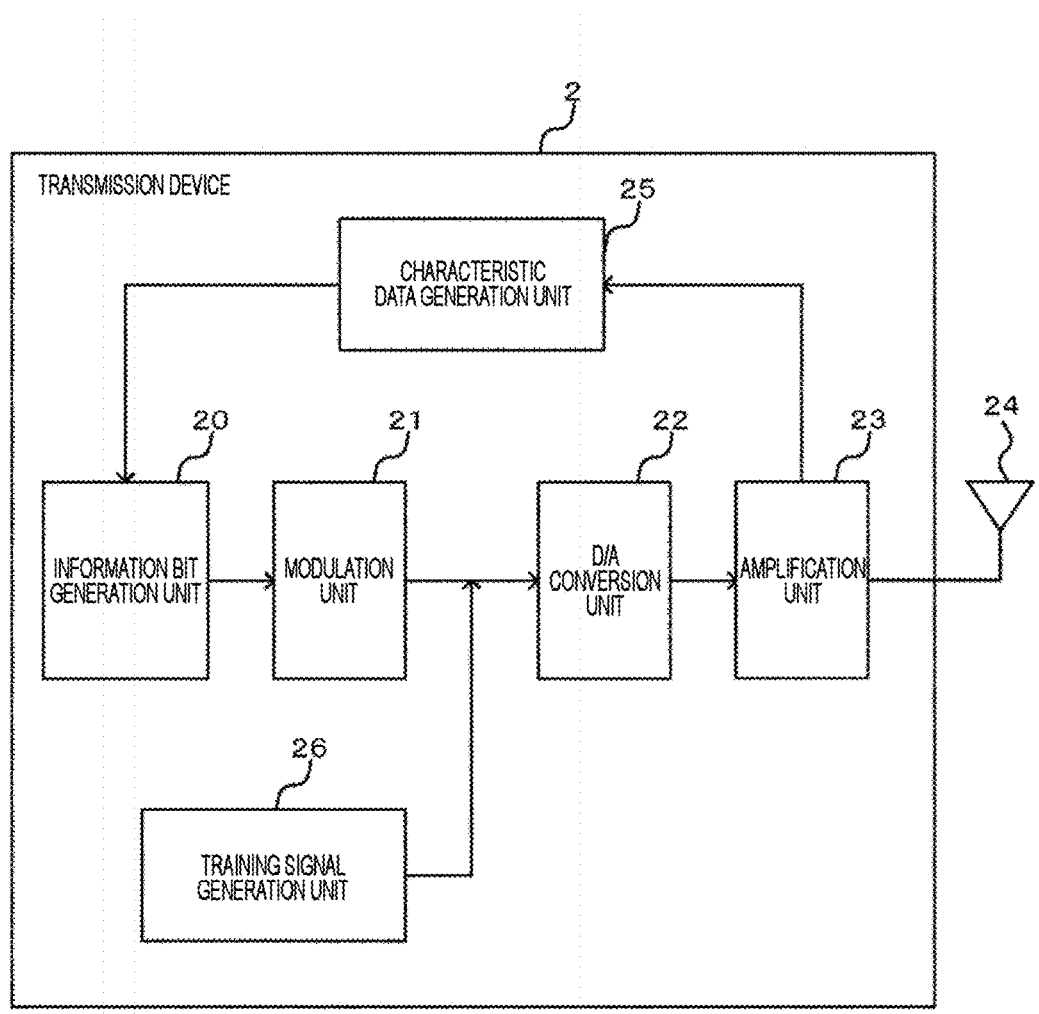
FIG. 6 is a functional block diagram illustrating functions of a transmission device according to the embodiment.

FIG. 6 is a functional block diagram illustrating functions of the transmission device 2 according to the embodiment. Note that, in the transmission device 2 illustrated in FIG. 6, components substantially the same as those of the transmission device 2a illustrated in FIG. 2 are denoted by the same reference signs.

As illustrated in FIG. 6, the transmission device 2 according to the embodiment includes the information bit generation unit 20, the modulation unit 21, the D/A conversion unit 22, the amplification unit 23, the antenna 24, a characteristic data generation unit 25, and a training signal generation unit 26.

The characteristic data generation unit 25 converts the input-output characteristic of the amplification unit 23 into data, generates characteristic information indicating the input-output characteristic of the amplification unit 23, and outputs the characteristic information to the information bit generation unit 20.

Thus, the information bit generation unit 20 includes the characteristic information indicating the input-output characteristic of the amplification unit 23 in information bits to be generated.

The training signal generation unit 26 generates training signals of a plurality of radius (amplitude) patterns depending on the constellation, and adds the training signals to a signal output by the modulation unit 21 to the D/A conversion unit 22.

Figure 7:
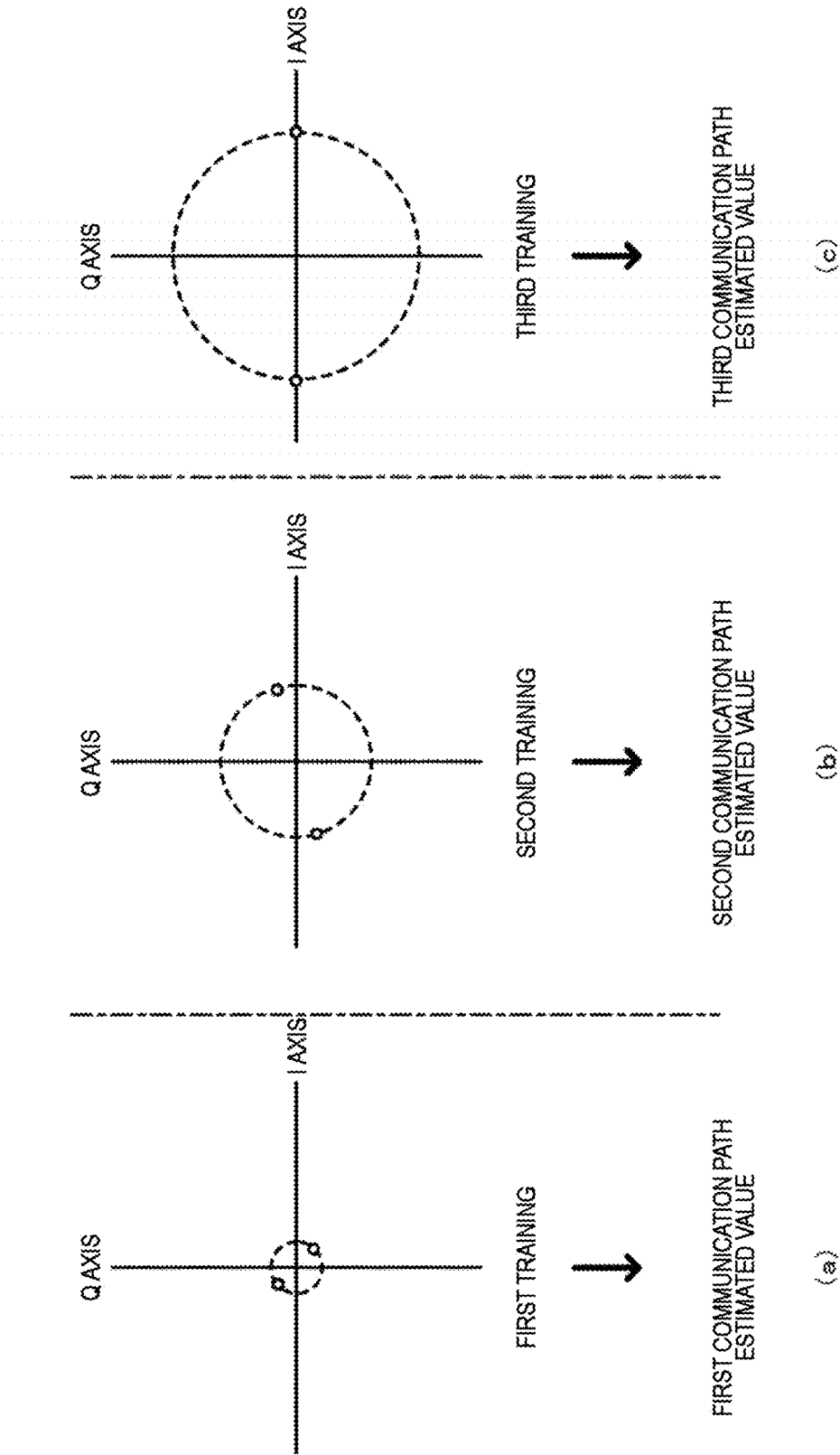
FIG. 7(a) is a diagram illustrating a first training signal for a first inner circumference generated by a training signal generation unit.
FIG. 7(b) is a diagram illustrating a second training signal for a second inner circumference generated by the training signal generation unit.
FIG. 7(c) is a diagram illustrating a third training signal for an outermost circumference generated by the training signal generation unit.

FIG. 7 is a diagram illustrating training signals generated by the training signal generation unit 26 for the constellation illustrated in FIG. 3, for example. FIG. 7(a) is a diagram illustrating a first training signal for the first inner circumference A generated by the training signal generation unit 26. FIG. 7(b) is a diagram illustrating a second training signal for the second inner circumference B generated by the training signal generation unit 26. FIG. 7(c) is a diagram illustrating a third training signal for the outermost circumference C generated by the training signal generation unit 26.

As illustrated in FIGS. 7(a) to 7(c), the training signal generation unit 26 generates three training signals for the constellation illustrated in FIG. 3, for example. Here, the training signals illustrated in FIGS. 7(a) to 7(c) are some of signal points of a case where it is assumed that, for example, an input-output characteristic in the non-linear region of the amplification unit 23 is also linear.

As described above, the training signals include a plurality of signal points having different amplitudes on the constellation before the amplification unit 23 amplifies the signal.

Then, the three training signals illustrated in FIGS. 7(a) to 7(c) are transmitted to the reception device 4, and are used for calculation of a signal considered to be amplified by an ideal amplifier capable of linear amplification from a small input power to a large input power.

Figure 8:
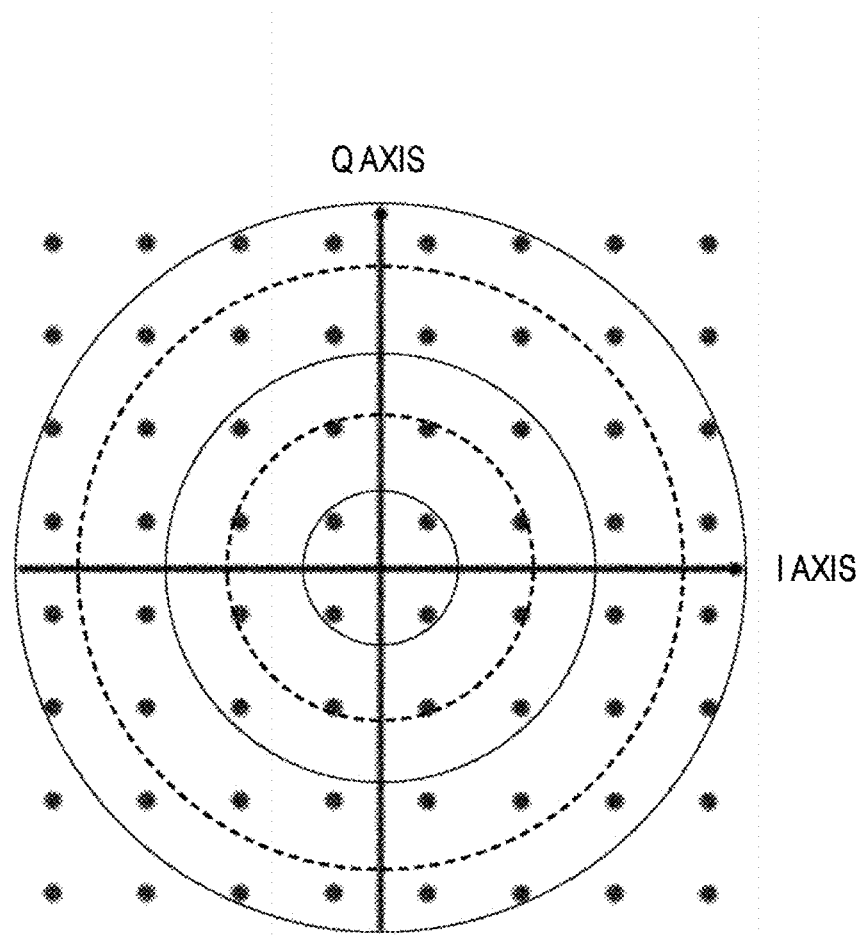
FIG. 8 is a diagram illustrating another example of a training signal generated by the training signal generation unit.

FIG. 8 is a diagram illustrating another example of the training signal generated by the training signal generation unit 26. As illustrated in FIG. 8, the training signal generated by the training signal generation unit 26 may be a training signal including one signal point selected for each of regions on a constellation determined in advance including a plurality of signal points.

That is, for a constellation having many signal points, the number of signal points included in the training signal can be reduced by selecting a signal point representing a plurality of signal points.

Figure 9:
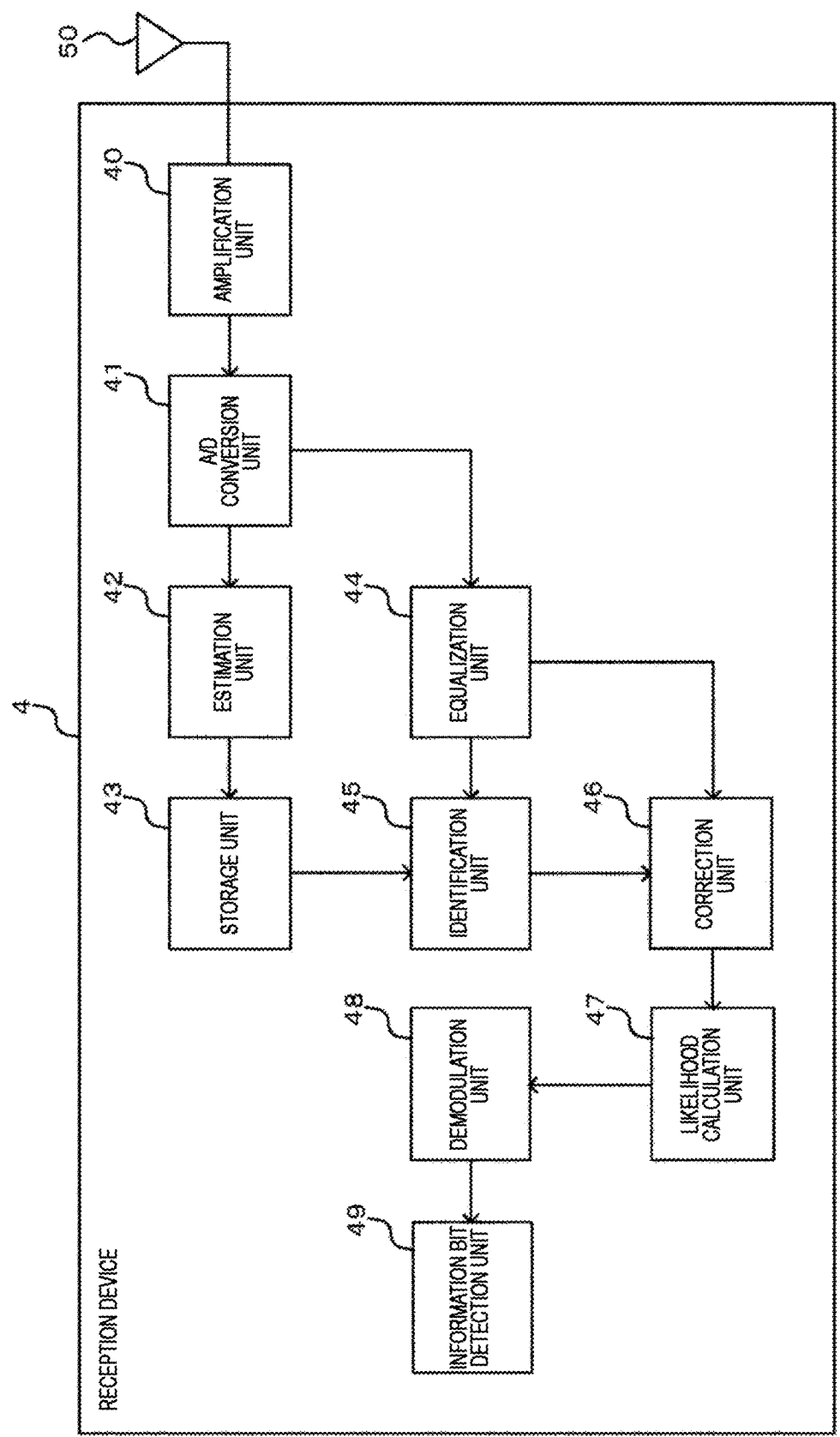
FIG. 9 is a functional block diagram illustrating functions of a reception device according to the embodiment.

FIG. 9 is a functional block diagram illustrating functions of the reception device 4 according to the embodiment. As illustrated in FIG. 9, the reception device 4 according to the embodiment includes an amplification unit 40, an A/D conversion unit 41, an estimation unit 42, a storage unit 43, an equalization unit 44, an identification unit 45, a correction unit 46, a likelihood calculation unit 47, a demodulation unit 48, an information bit detection unit 49, and an antenna 50.

The amplification unit 40 amplifies an analog signal received by the reception device 4 via the antenna 50 and outputs the amplified analog signal to the A/D conversion unit 41.

The A/D conversion unit 41 converts the analog signal amplified by the amplification unit 40 into a digital signal and outputs the digital signal to the estimation unit 42 and the equalization unit 44. For example, the A/D conversion unit 41 converts a training signal including the characteristic information indicating the input-output characteristic of the amplification unit 23 included in the transmission device 2 into a digital signal and outputs the digital signal to the estimation unit 42. In addition, the A/D conversion unit 41 converts a data signal corresponding to information bits to be transmitted from the transmission device 2 to the reception device 4 into a digital signal and outputs the digital signal to the equalization unit 44.

Note that the training signal converted into the digital signal by the A/D conversion unit 41 is transmitted when the transmission device 2 and the reception device 4 start communication.

The estimation unit 42 estimates a communication path on the basis of the training signal input from the A/D conversion unit 41 (for example, a first communication path estimated value to a third communication path estimated value illustrated in FIG. 7). That is, the estimation unit 42 estimates signal points included in the training signal of a case where it is assumed that the input-output characteristic in the non-linear region of the amplification unit 23 is also linear, on the basis of the characteristic information indicating the input-output characteristic including the non-linear region of the amplification unit 23 provided in the transmission device 2 to amplify a signal to be transmitted.

The storage unit 43 stores the communication path estimated by the estimation unit 42, and outputs the communication path according to an accelerator from the identification unit 45. That is, the reception device 4 can share the characteristic information indicating the input-output characteristic of the amplification unit 23 with the transmission device 2.

The equalization unit 44 performs initial equalization on the data signal input from the A/D conversion unit 41, and outputs the data signal to the identification unit 45 and the correction unit 46.

The identification unit 45 identifies a signal value that needs correction in the data signal subjected to initial equalization by the equalization unit 44 on the basis of the communication path (for example, the first communication path estimated value to the third communication path estimated value illustrated in FIG. 7) stored in the storage unit 43, and outputs the signal value to the correction unit 46.

The correction unit 46 corrects the signal value subjected to initial equalization by the equalization unit 44 on the basis of the signal value identified by the identification unit 45, and outputs a signal including the corrected constellation to the likelihood calculation unit 47. For example, the correction unit 46 performs correction by multiplying the signal value subjected to initial equalization by the equalization unit 44 by a ratio between the non-linear input-output characteristic and the linear input-output characteristic.

FIG. 10 is a diagram illustrating a processing process in which the correction unit 46 corrects the signal values subjected to initial equalization by the equalization unit 44. FIG. 10(a) is a diagram illustrating signal points subjected to initial equalization by the equalization unit 44. FIG. 10(b) is a diagram illustrating the third communication path estimated value identified by the identification unit 45. FIG. 10(c) is a diagram illustrating a constellation corrected by the correction unit 46.

As illustrated in FIG. 10, the correction unit 46 outputs the corrected constellation (c) to the likelihood calculation unit 47 on the basis of the signal point (b) included in the training signal of a case where it is assumed that the input-output characteristic in the non-linear region of the amplification unit 23 is also be linear with respect to the constellation (a) distorted due to the input-output characteristic of the amplification unit 23.

The likelihood calculation unit 47 calculates a likelihood of the signal corrected by the correction unit 46 with respect to the constellation before the amplification unit 23 of the transmission device 2 amplifies the signal, and outputs the calculated likelihood to the demodulation unit 48.

The demodulation unit 48 demodulates the signal on the basis of the likelihood calculated by the likelihood calculation unit 47, and outputs the demodulated signal to the information bit detection unit 49.

The information bit detection unit 49 detects information bits from the signal demodulated by the demodulation unit 48. Thus, since the reception device 4 according to the embodiment corrects the signal subjected to initial equalization by the equalization unit 44 and demodulates the signal on the basis of the likelihood calculated by the likelihood calculation unit 47, the signal can be accurately demodulated even if the transmission device 2 that performs single-carrier multi-level modulation transmits the signal amplified by using the non-linear region.

As described above, the reception device 4 can perform likelihood calculation based on a non-distortion constellation before a Euclidean distance between signal points is narrowed, and can accurately demodulate the signal.

Note that, some or all of the units constituting the transmission device 2 and the reception device 4 in the embodiment described above may be configured by hardware, or may be configured by causing a processor to execute a program.

In addition, in a case where some or all of the units constituting the transmission device 2 and the reception device 4 are configured by causing a processor to execute a program, the program may be recorded in a recording medium and supplied, or may be supplied via a network.

REFERENCE SIGNS LIST

1 Wireless communication system
2, 2a Transmission device
4 Reception device
20 Information bit generation unit
21 Modulation unit
22 D/A conversion unit
23 Amplification unit
24 Antenna
25 Characteristic data generation unit 26 Training signal generation unit
40 Amplification unit
41 A/D conversion unit
42 Estimation unit
43 Storage unit
44 Equalization unit
45 Identification unit
46 Correction unit
47 Likelihood calculation unit
48 Demodulation unit
49 Information bit detection unit
50 Antenna

The invention claimed is:

1. A wireless communication system in which a reception device demodulates a signal on the basis of a training signal transmitted by a transmission device that performs single-carrier multi-level modulation,
wherein
the transmission device
transmits the training signal to the reception device such that a plurality of signal points having different amplitudes on a constellation is included, and
the reception device includes:
an estimation circuitry configured to estimate the signal points included in the training signal in a case where on the basis of characteristic information indicating an input-output characteristic including a non-linear region of an amplifier that is provided in the transmission device to amplify a signal to be transmitted, the input-output characteristic in the non-linear region of the amplifier is also linear;
an equalization circuitry configured to perform initial equalization on a received signal;
a correction circuitry configured to correct the received signal subjected to the initial equalization by the equalization circuitry on the basis of the signal points estimated by the estimation circuitry;
a likelihood calculation circuitry configured to calculate, with respect to a constellation before the amplifier amplifies the signal to be transmitted, a likelihood of the received signal corrected by the correction circuitry; and
a demodulation circuitry configured to demodulate the signal on the basis of the likelihood calculated by the likelihood calculation circuitry.

2. The wireless communication system according to claim 1, wherein
the reception device
receives the characteristic information from the transmission device.

3. The wireless communication system according to claim 1, wherein
the training signal includes
the plurality of signal points having different amplitudes on the constellation before the amplifier amplifies the signal to be transmitted.

4. The wireless communication system according to claim 1, wherein
the training signal
includes one signal point selected for each of regions on a predetermined constellation including the plurality of signal points.

5. A wireless communication method in which a reception device demodulates a signal on the basis of a training signal transmitted by a transmission device that performs single-carrier multi-level modulation,
the wireless communication method comprising:
transmitting, by the transmission device, the training signal to the reception device such that a plurality of signal points having different amplitudes on a constellation is included;
estimating, by the reception device, the signal points included in the training signal in a case where on the basis of characteristic information indicating an input-output characteristic including a non-linear region of an amplifier that is provided in the transmission device amplifying a signal to be transmitted, the input-output characteristic in the non-linear region of the amplifier is also linear;
performing, by the reception device, initial equalization on a received signal;
correcting, by the reception device, the received signal subjected to the initial equalization on the basis of the signal points estimated;
calculating, by the reception device, with respect to a constellation before the amplifier amplifies the signal to be transmitted, a likelihood of the received signal corrected; and
demodulating, by the reception device, the signal on the basis of the likelihood calculated.

6. A reception device that demodulates a signal on the basis of a training signal transmitted by a transmission device that performs single-carrier multi-level modulation,
the reception device comprising:
an estimation circuitry configured to estimate a plurality of signal points included in the training signal transmitted by the transmission device such that the plurality of signal points having different amplitudes on a constellation is included in a case where, on the basis of characteristic information indicating an input-output characteristic including a non-linear region of an amplifier that is provided in the transmission device to amplify a signal to be transmitted, the input-output characteristic in the non-linear region of the amplifier is also linear;
an equalization circuitry configured to perform initial equalization on a received signal;
a correction circuitry configured to correct the received signal subjected to the initial equalization by the equalization circuitry on the basis of the signal points estimated by the estimation circuitry;
a likelihood calculation circuitry configured to calculate, with respect to a constellation before the amplifier amplifies the signal to be transmitted, a likelihood of the received signal corrected by the correction circuitry; and
a demodulation circuitry configured to demodulate the signal on the basis of the likelihood calculated by the likelihood calculation circuitry.

7. The reception device according to claim 6, wherein
the estimation circuitry
estimates the signal points on the basis of the characteristic information transmitted by the transmission device.

8. The reception device according to claim 6, wherein
the training signal includes
the plurality of signal points having different amplitudes on the constellation before the amplifier amplifies the signal to be transmitted.

* * * * *